A. SINDING-LARSEN.
SEPARATING MIXTURES OF GASES.
APPLICATION FILED MAR. 26, 1910.
1,091,023.
Patented Mar. 24, 1914.
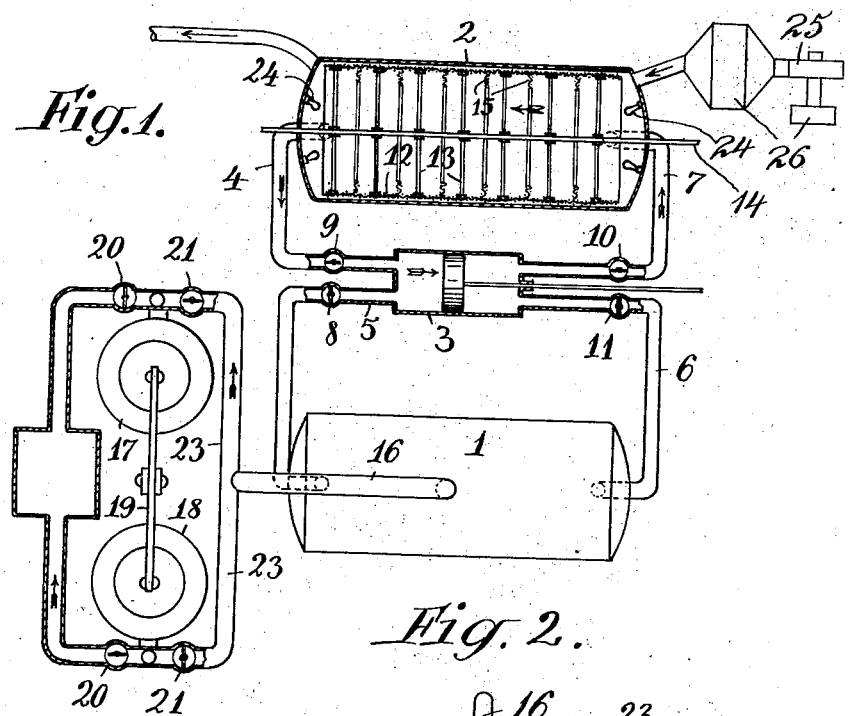
Fig. 1.
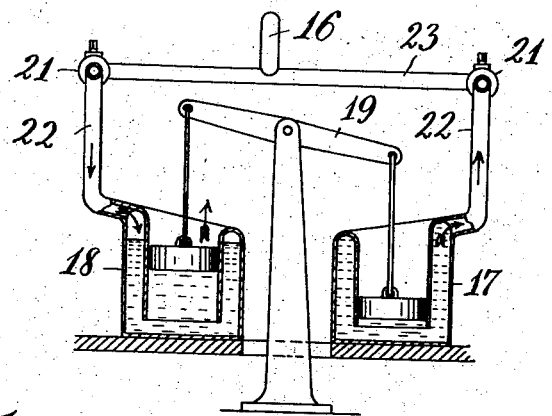
Fig. 2.
Fig. 3.
Witnesses
B. Sommers
May Ellis.
Inventor.
Alf Sinding-Larsen
By
Atty.

UNITED STATES PATENT OFFICE.

ALF SINDING-LARSEN, OF CHRISTIANIA, NORWAY.

SEPARATING MIXTURES OF GASES.

1,091,023.  Specification of Letters Patent. Patented Mar. 24, 1914.

Application filed March 26, 1910. Serial No. 551,679.

*To all whom it may concern:*

Be it known that I, ALF SINDING-LARSEN, a subject of the King of Norway, residing at Christiania, Norway, have invented certain new and useful Improvements in Separating Mixtures of Gases; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention has for its object a process of separating from mixtures of gases one or more of their constituents, and is based upon the ability of hemoglobin, for instance blood, and other similar substances of absorbing various gases and giving off the same again, when physical conditions are changed.

To facilitate the absorption of the gases, the absorbent should be treated so as to subject the largest surface possible to the action of the gases, and this could be effected for instance by forcing the gases through a scrubber, in which a solution of the absorbent is trickling down in a finely divided stream. Of course the same result may be obtained in various ways, for instance, by blowing the mixture of gases into a solution of the absorbent through fine nozzles, or by beating the gases into the solution of the absorbent. To subsequently effect the emission of the dissolved gases from the absorption liquid, it is likewise necessary that the solution present a very large surface. The emission of the gases may then be brought about either by a reduction of the atmospheric pressure upon the surface of the liquid, or by treating the liquid with another gas, which is absorbed by the liquid more energetically than the gas or gases previously absorbed, so that a kind of substitution takes place. The emission of the gases may also be effected by a change in the temperature, or by other means. It is preferred, however, to effect the emission of the gases by a change in the atmospheric pressure upon the absorption liquid. This is particularly of advantage when a plurality of gases absorbed in the liquid are to be separately recovered, and this may be effected in a very simple manner by subjecting the solution to fractional evacuation, that is, the gases which are less firmly held are emitted at a lower vacuum, and the gases which are more firmly held, at a higher vacuum, (that is, at a lower pressure). Nitrogen and oxygen may thus be separated from air, nitrogen from its mixture with nitric oxid, carbon monoxid from its mixture with hydrogen, &c.

In carrying out the process an apparatus comprising a plurality of scrubbers arranged one above the other may be employed. The upper ones may then be employed as absorption chambers, while the lower ones, in which a suitable vacuum may be produced, serve as emission chambers, from which latter the solution employed is again brought back into the upper absorption scrubbers. It is preferred, however, to employ an apparatus in which the circulation of the absorption liquid takes place practically at a level, so that the working of the circulation pumps will require the least possible amount of energy.

The accompanying drawings illustrate an apparatus which may be used for carrying this invention into effect.

Figure 1 represents diagrammatically a plan view of the apparatus, partially in section. Fig. 2 illustrates the arrangement of the vacuum pumps and the valves of the latter. Fig. 3 represents a vertical section of one of the vessels.

Between the vacuum vessel 1 and the pressure vessel 2, which are arranged on a level with each other, is placed a circulation pump 3, one end of which communicates through a pipe 4 and valve 9 with one end of the pressure vessel 2 at the bottom of the same, and through a second pipe 5 and valve 8 with one end of the vacuum vessel 1. The other end of the pump is likewise connected with the opposite ends of the vacuum vessel 1 and pressure vessel 2, through pipe 6 and valve 11 and pipe 7 and valve 10, respectively. The pressure in the vessel 2 is maintained but slightly above atmospheric pressure, while the vacuum in vessel 1 is maintained at from about 15-30 mm. of mercury. The gas mixture to be treated is supplied to vessel 2 by a fan 25.

In the example illustrated pipe 4 serves to conduct liquid from the pressure vessel 2 into the pump chamber on one side of the piston when moving to the right, while the pipe 5 conducts liquid from the pump chamber into the vacuum vessel 1. From the vessel 1 the liquid flows into the other pump chamber on the other side of the piston through pipe 6, when the piston moves to the left, and from here through pipe 7 back into the pressure vessel 2, when the piston moves to the right. The cocks 8, 9, 10 and 11 are so arranged that when the piston moves from left to right only the valves 9 and 10 in the pipes 4 and 7 are open, while the other valves are closed. When the piston moves from right to left the valves 9 and 10 are closed and the valves 8 and 11 are opened. The valves may be operated by various means, but it is preferred to employ electro-magnetic mechanisms to operate them.

During the movement of the piston from left to right gas containing liquid flows in the direction indicated by the arrows in the drawing, from the left end of the pressure vessel 2 into the left pump chamber, while the liquid, which has been drawn into the right pump chamber during the previous stroke of the piston, and which has been freed from gas, is forced into the pressure vessel. At the return stroke of the piston both pump chambers communicate with the vacuum vessel 1, so that the gas-containing liquid in the left pump chamber is forced into the left end of the vacuum vessel, while the right pump chamber is filled with liquid from the right end of the vacuum vessel. It will be understood that by this arrangement of the pump no energy is necessary to overcome the pressure difference between the vessels. Practically the power required to work the pump has only to overcome the frictional resistance in the various pipes and in the pump mechanism itself, as the pressures on both sides of the piston will at any time be equal, and accordingly neutralize each other, whether the piston is moved from the right or from the left.

In the interior of the vessels 1 and 2 are arranged mechanically operated stirrers for the purpose of facilitating the absorption and emission of the gases. These stirrers comprise a cylinder 12 made by stretching a cloth of any kind over suitable frames 13 carried by revolving shafts 14 mounted in the vessels. The inside of said cylinders is provided with annular ribs or projections 15, likewise made of stretched cloth. When these cylinders revolve in the vessels 1 and 2, the liquid, which is carried around with the cylinder, will present a large surface, so that the absorption and emission of the gases will be facilitated.

It is of importance that the blood, when blood is used, be obtained and stored prior to its use, in such a manner as to avoid as far as possible the introduction of bacteria.

To prevent the destruction of the absorption liquid by the action of ferments and bacteria, the liquid may be subjected during the process to the action of suitable natural or artificial light, which may for instance be produced by means of electrical, incandescent lamps 24, such as shown in the drawing. For the same purpose, sugar, glycerin, saccharate of iron, other organic iron compounds, or other substances which are capable of preventing fermentation, may be added to the liquid, five per cent. of preservative being sufficient under ordinary conditions. To prevent such fermentation from taking place the gas mixture to be separated may also be forced through suitable filtering layers before it is brought into the liquid, for instance sterilized cotton contained in a chamber 26, or the like. The absorption capacity of blood as used in this process is usually about 150 liters of oxygen per cubic meter of blood.

The top of the vacuum vessel is connected by a pipe 16 with a double acting vacuum pump. This latter is provided with two pump cylinders 17 and 18 and is so arranged that the vacuum, which is produced by the piston strokes in one cylinder is utilized also to initiate the production of vacuum in the other pump cylinder. This is brought about by the arrangement, that the piston rods are connected to a balance rod 19, and that the opening of the outlet valves 20 of the pump is not effected before the corresponding piston has been moved a distance downward, under the action of the vacuum below the same. The pump cylinders are further provided with an outer casing to contain oil or other suitable liquid, which in this case constitutes the piston proper. By means of a piston arrangement of this kind there is obtained a complete filling of the dead space, i. e. there is no clearance, which would otherwise necessarily be produced at the beginning of the return stroke of the piston, when the outlet valve has been closed. The arrangement is illustrated in Fig. 2, where 21 indicates the valve, which connects the pump pipe 22 with the pipes 23 leading to the vacuum vessel 1.

The valves 20 and 21 are preferably actuated by electro-magnetic means and in such a manner that the vacuum valves 21 are closed when the pump rods have arrived at their extreme upper position, while the outlet valves 20 are not opened until the piston has been moved so far on the downward stroke that the vacuum, which has been formed between the valves and the pistons, is eliminated, and are not again closed before the liquid piston has arrived at the valve or has passed through the same, which should take place at the moment when the pistons arrive in their opposite (down) extreme position.

The purity of the nitrogen and oxygen when separated will be from 95 to 98 per cent.

It will be understood that the above described process will be of great importance in the development of the modern chemical and electro-thermical air industry, owing to the fact, that, for instance, the cyanamid process is dependent on the possibility of obtaining pure nitrogen at a low cost, and as regards the various processes of obtaining nitric acid by burning air in electrical flame arcs; these would give much better results if oxygen-nitrogen mixtures could be employed, which are more favorable than the atmospheric air in regard to the chemical balance, according to the law of Guldberg-Waage. Moreover, the above described process may be of great consequence in the production of such gases, which are contained in gas mixtures obtained in various thermical and chemical processes.

I claim—

1. The process of separating oxygen containing constituents of gas mixtures, which comprises passing the gas mixture through an absorption chamber supplied with a solution containing hemoglobin, said solution presenting a large surface to the action of the mixture, subjecting the resulting compound containing an oxygen containing gas in a second chamber to the action of a lower pressure to remove the gas contained therein, and returning the solution again to the absorption chamber for the absorption of a fresh quantity of gas.

2. The process of separating oxygen containing constituents of gas mixtures, which comprises passing the mixture at a pressure slightly above atmospheric pressure through an absorption chamber supplied with a solution containing hemoglobin, said solution presenting a large surface to the action of the mixture, and then subjecting the resulting compound to evacuation to liberate the oxygen containing gas contained in said compound.

3. The process of separating oxygen containing gases from mixtures of gases, which comprises absorbing the gases by blood, maintaining the blood sterile during the process, and then removing the absorbed gas by evacuation.

4. The process of separating oxygen containing gases from mixtures of gases, which comprises conducting the gas mixture into a closed chamber in contact with blood, maintaining the blood sterile during the process and exhausting the absorbed gas from the blood in a separate closed chamber.

5. The process of separating oxygen containing gases from mixtures of gases, which comprises absorbing the gases by blood, maintaining the blood sterile during the process by the action of light thereon, and then removing the absorbed gas by evacuation.

6. The process of separating oxygen containing gases from mixtures of gases, which comprises conducting the gas mixture into a closed chamber in contact with blood, maintaining the blood sterile during the process by the action of light and a suitable organic antiseptic, and exhausting the absorbed gas from the blood in a separate closed chamber.

7. The process of separating oxygen containing gases from gas mixtures, which comprises subjecting a solution containing hemoglobin and presenting a large surface to the action of the gas mixture in an absorption chamber, and then subjecting the resulting solution to fractional evacuation to successively separate the different oxygen gases contained in the hemoglobin.

In testimony that I claim the foregoing as my invention, I have signed my name in presence of two subscribing witnesses.

ALF SINDING-LARSEN.

Witnesses:
 HENRY BORDEWICH,
 MARTIN E. GUTTORMSEN.